United States Patent [19]

Atkinson

[11] 4,149,040
[45] Apr. 10, 1979

[54] IDENTIFIER CIRCUIT FOR IDENTIFYING PARTY LINE SUBSCRIBERS

[75] Inventor: Roger Atkinson, Huntsville, Ala.

[73] Assignee: Itec, Inc., Huntsville, Ala.

[21] Appl. No.: 849,244

[22] Filed: Nov. 7, 1977

[51] Int. Cl.² .......................................... H04M 15/36
[52] U.S. Cl. ................................................ 179/17 A
[58] Field of Search ......................... 179/17 A, 18 FH

[56] References Cited

U.S. PATENT DOCUMENTS

| | | | |
|---|---|---|---|
| 2,820,100 | 1/1958 | Abbott | 179/17 A |
| 4,001,512 | 1/1977 | Proctor et al. | 179/17 A |
| 4,054,942 | 10/1977 | Chambers, Jr. | 179/17 A |
| 4,079,205 | 3/1978 | Glenn | 179/17 A |

Primary Examiner—Kathleen H. Claffy
Assistant Examiner—Randall P. Myers
Attorney, Agent, or Firm—Rose & Edell

[57] ABSTRACT

An identifier circuit for connection between a telephone system party line and a party line subscriber to permit identification of a calling party line subscriber with automatic number identifying equipment at a central office. The identifier circuit includes a pair of terminals adapted to be selectively connected to ground in accordance with identification of a particular party line subscriber, a pair of normally nonconductive test transistors each connected between one of the terminals and one of the leads of the party line, a pair of control transistors responsive to voltage on the party line to maintain the test transistors nonconductive and responsive to removal of the party line voltage to permit the test transistors to conduct, and a pair of capacitors charged when a calling subscriber goes off hook and discharged to maintain the test transistors conductive for a predetermined time during which testing of the party line to identify the calling subscriber can be accomplished with automatic number identifying equipment at the central office.

15 Claims, 2 Drawing Figures

IDENTIFIER CIRCUIT FOR IDENTIFYING PARTY LINE SUBSCRIBERS

BACKGROUND OF THE INVENTION

1. Field of the Invention

The present invention pertains to the identification of subscribers in a party line telephone system and, more particularly, to an identifier circuit for placing a selective ground mark on a party line representative of a calling subscriber.

2. Discussion of the Prior Art

As an alternative to verbally requesting a telephone operator to place a long distance call, most telephone subscribers in the United States and Canada can place such calls via Direct Distance Dailing (DDD). For obvious reasons, a subscriber placing a DDD call must be identified, and such identity must be associated with a record of the time the call was placed, the duration of the call and the telephone number called to be later associated with the calling subscriber's account for billing purposes. In the telephone industry, a subscriber's telephone number is usually his account number. A telephone number is assigned to a particular outlet/inlet (appearance) of a switching matrix at a central office. Therefore, for billing purposes, a DDD call need only be associated with a telephone number irrespective of which telephone instrument (extension) placed the call. In most cases, one pair of wires extends from the central office to the subscriber's premises (home or business) where one or more telephone instruments are connected in parallel to that pair. Even if the telephone instruments are located in different buildings and such buildings are connected via separate pairs to the central office electrically, such telephone extensions will have the same number.

There are two basic methods of identifying a calling subscriber. Operator Number Identification (ONI) requires the intervention of an operator at the completion of dialing of the called number. The operator asks the caller his telephone number and records this number on a record associated with the details of the call (time and called number). Time of answer, if any, and time of disconnect or elapsed connect time are later recorded. Automatic Number Identification (ANI) works the same way with the exception that the operator is replaced by electronic equipment at a central office that determines through which matrix appearance a call was placed and records this information as described above, usually on magnetic or paper tape. Obvious disadvantages of ONI include high recurring cost of operators, billing errors due to operator error, and billing errors due to intentional or accidental transmission by the subscriber of an incorrect number.

So long as only one subscriber is connected to a matrix appearance, automatic number identification is confined to determining which appearance on the matrix placed the call in question. Frequently, however, in order to save switching apparatus and wire, two or more subscribers are connected to the same appearance and cable pair. Thus, we have the party line which allows neighboring premises to be connected in parallel to a single pair of leads connected to the central office, often many miles distant. Such arrangements are common in suburban and rural areas where the high cost of outside cable and central office equipment must be shared by multiple subscribers in order to keep rates down, and/or because the telephone utility lacks the time or resources to install sufficient lead pairs and equipment to provide each subscriber with a private line. Party lines complicate the ANI task by requiring that the equipment in the central office identify not only the matrix appearance but which of several subscribers connected at a distance via one pair of leads to this appearance actually placed the call.

Two common party line identification schemes are called circle digit and ground mark. Circle digit is so named because, in addition to other numbers, the calling subscriber must dial a digit printed in a circle on the number plate attached to the dial of his telephone instrument, which digit is unique to each subscriber on the party line. This method can uniquely identify up to ten parties on a line; however, like ONI, is subject to erroneous billing due to accidental or intentional transmission of an incorrect digit.

Ground mark type identification schemes involve placing a resistance ground on one of the pair of leads, commonly referred to as tip and ring, of the party line while the telephone instrument is off hook. This ground is usually derived from a 2650 ohm winding in the bell. Thus, ringing and identification schemes can complement each other and provide two-party selective ringing as well as party identification by connecting the bells in one party's telephone instruments from ground through a capacitor to the ring lead and in the other party's telephone instruments from ground through a capacitor to the tip lead while the telephone instrument is on hook and directly to both sides of the line when the telephone instrument is off hook. This scheme can be expanded to identify four parties by connecting the bells as above for parties one and two, and through diodes for parties three and four.

The major problem with ground mark identification is longitudinal imbalance, it being necessary, due to the presence of sometimes very high induced AC voltages from commercial power distribution, that telephone speech circuits be AC balanced with respect to ground. In a perfectly balanced circuit, power noise will be induced equally into both leads of the line. Therefore, common mode noise signals will cancel each other, and subscribers will hear no noise. Any imbalance, such as a ringer to ground will cause the common mode rejection quality (called longitudinal balance) to degrade. Unfortunately, the circuits which are most likely to be party lines (long rural loops) are also subject to the greatest common mode voltage since telephone lines are normally attached to poles or buried along power distribution rights of way.

A secondary disadvantage of ground mark identification in the requirement that all telephone instruments on the subscribers premises be wired in the appropriate manner for that party. Thus, if a subscriber connect his own phone to the line, billing errors are likely.

Since most non-circle digit ANI systems use some ground mark method for party identification, there is a need to apply the ground mark only during the identification period so as not to unbalance the line during talking. A device for providing such function should be designed for installation outside the premises so that one device can serve all phones at that subscriber's location, and so that the installer does not have to gain access to the inside of the subscriber's premises. Several prior art devices have been developed with the above considerations in mind; however, such devices have been more successful at serving all phones at a location, such as by a simple series connection which allows detection of current flow due to one or more phones on the premises being off hook, than at applying a ground mark during dialing. A few devices use a method other than ground marking, which has the disadvantage of making them applicable only to special automatic number identifying equipment at the central office. Other devices leave the ground mark in during part or all of the conversation, for example, until the polarity reverses. Such devices are useful only in step exchanges on completed outgoing local calls. Incoming calls, operator calls, and perhaps outgoing long distance calls do not reverse the polarity of the tip and ring leads and, therefore, allow the ground mark to remain on the line having thus the disadvantage of causing an imbalance. Another prior art device serves only for two party identification and interferes with dial pulsing by applying the ground mark during each open period (pulse).

U.S. Pat. Nos. 2,794,859 to Abbott et al., 2,820,100 to Abbott, 2,901,544 to Collins, 3,005,052 to Powers, 3,760,112 to Bush, 3,927,270 to Davis and 4,001,512 to Procter et al. are exemplary of the above discussed prior art attempts to provide devices for two or four party identification in party line telephone systems.

SUMMARY OF THE INVENTION

Accordingly, it is a primary object of the present invention to provide an identifier circuit for two or four party lines overcoming the above mentioned disadvantages of the prior art.

Another object of the present invention is to identify a calling subscriber on a party line with an identifier circuit which applies an appropriate ground mark only when normal loop voltage is removed from the line by the central office such that no ground mark will be present during talking or dialing.

A further object of the present invention is to provide an identifier circuit for use with conventionally utilized automatic number identifying equipment to permit identification of a calling party line subscriber without causing longitudinal imbalance.

The present invention has an additional object in that an identifier circuit applies a ground mark to identify a calling party line subscriber only for a predetermined time after loop voltage is removed from the party line in response to a calling party line subscriber going off hook.

Yet another object of the present invention is to use capacitor discharge in an identifier circuit to define a predetermined time during which a ground mark is placed on one or both of the leads of a party line to permit automatic number identifying equipment at a central office to test the party line to identify a calling subscriber on a two or four party line.

The present invention has a further object in that an identifier circuit includes a pair of normally nonconductive test transistors connected between a pair of terminals and the leads of a party line and a pair of capacitors charged through a pair of charging transistors when a calling subscriber goes off hook, the capacitors discharging to render the test transistors conductive for a predetermined time such that a ground mark is applied to either or both of the leads of a party line in accordance with selective connection of the terminals to a reference potential terminal, such as ground.

Some of the advantages of the present invention over the prior art are that the identifier circuit provides ground mark identification without causing longitudinal imbalance during talking or dialing, the identifier circuit can be installed without individually wiring each telephone instrument of a party line subscriber and the identifier circuit can be used with existing automatic number identifying equipment thereby permitting the use thereof with all central offices having conventional automatic number identifying equipment.

The present invention is generally characterized in an identifier circuit for connection between a telephone system party line and a party line subscriber including a bus for connection with the party line, a reference potential terminal, and a time control means connecting the reference potential terminal to the bus for a predetermined time after voltage has been removed from the party line in response to a calling party line subscriber going off hook whereby the party line can be tested to identify a calling party line subscriber during the predetermined time.

Other objects and advantages of the present invention will become apparent from the following description of the preferred embodiment taken in conjunction with the accompanying drawings.

DESCRIPTION OF THE PREFERRED EMBODIMENT

Figure 1:
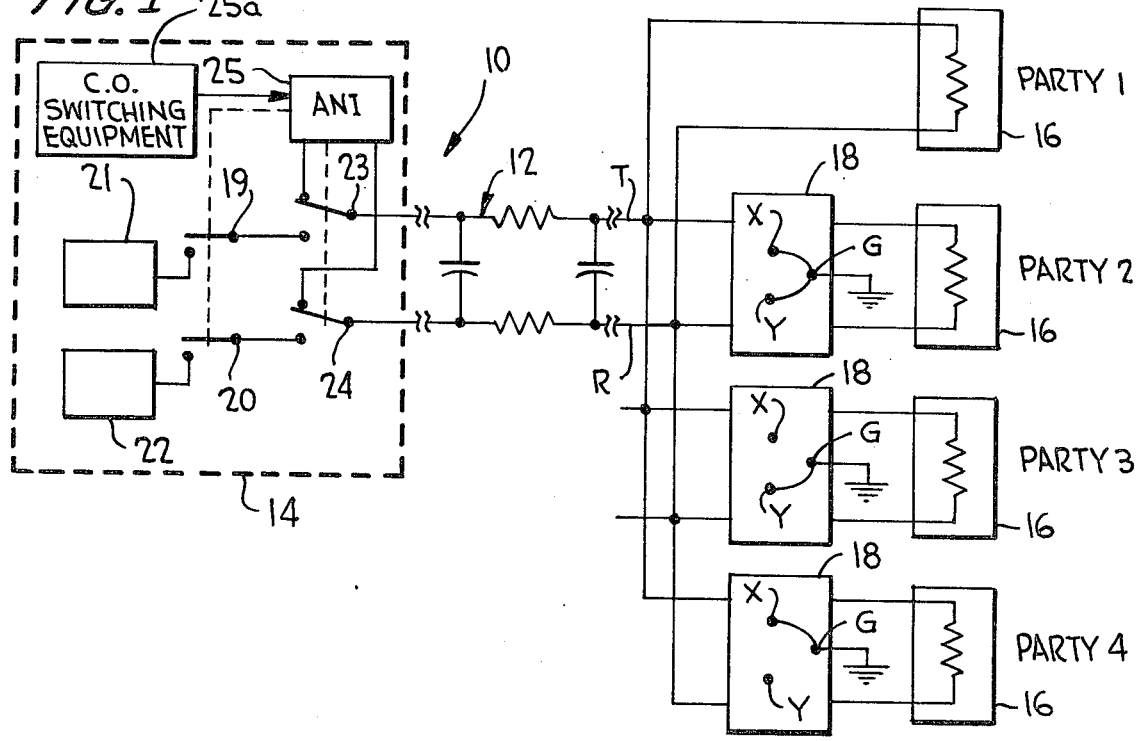
FIG. 1 is a block diagram of a party line telephone system using an identifier circuit according to the present invention.

An automatic number identification system 10 according to the present invention is shown in FIG. 1 and includes a party line 12 extending from a central office 14 to remote parties 1, 2, 3 and 4 connected in parallel across a tip lead T and a ring lead R of the party line 12. Each party has one or more telephone instruments, indicated generally at 16, with the telephone instrument 16 of party 1 connected directly across the tip and ring leads, and the telephone instruments of parties 2, 3 and 4 each connected across the tip and ring leads via an individual identifier circuit 18 in accordance with the prevent invention. The identifier circuits 18 contain circuitry, as will be described hereinafter, for connecting either or both of the tip and ring leads T and R via terminals X and Y, respectively, to a reference potential terminal, such as ground G, such that, for example, while party 1 has no ground mark associated therewith, party 2 has both tip and ring leads grounded, party 3 has the ring lead grounded and party 4 has the tip lead grounded.

The central office 14 contains conventional automatic number identification equipment including switches 19 and 20 operable to connect the tip and ring leads to current sensors 21 and 22, respectively, and switches 23 and 24 for applying test voltages to the tip and ring leads, respectively, the switches 19, 20, 23 and 24 being operated by conventional automatic number identification circuit 25 under the control of central office switching equipment 25a.

Figure 2:
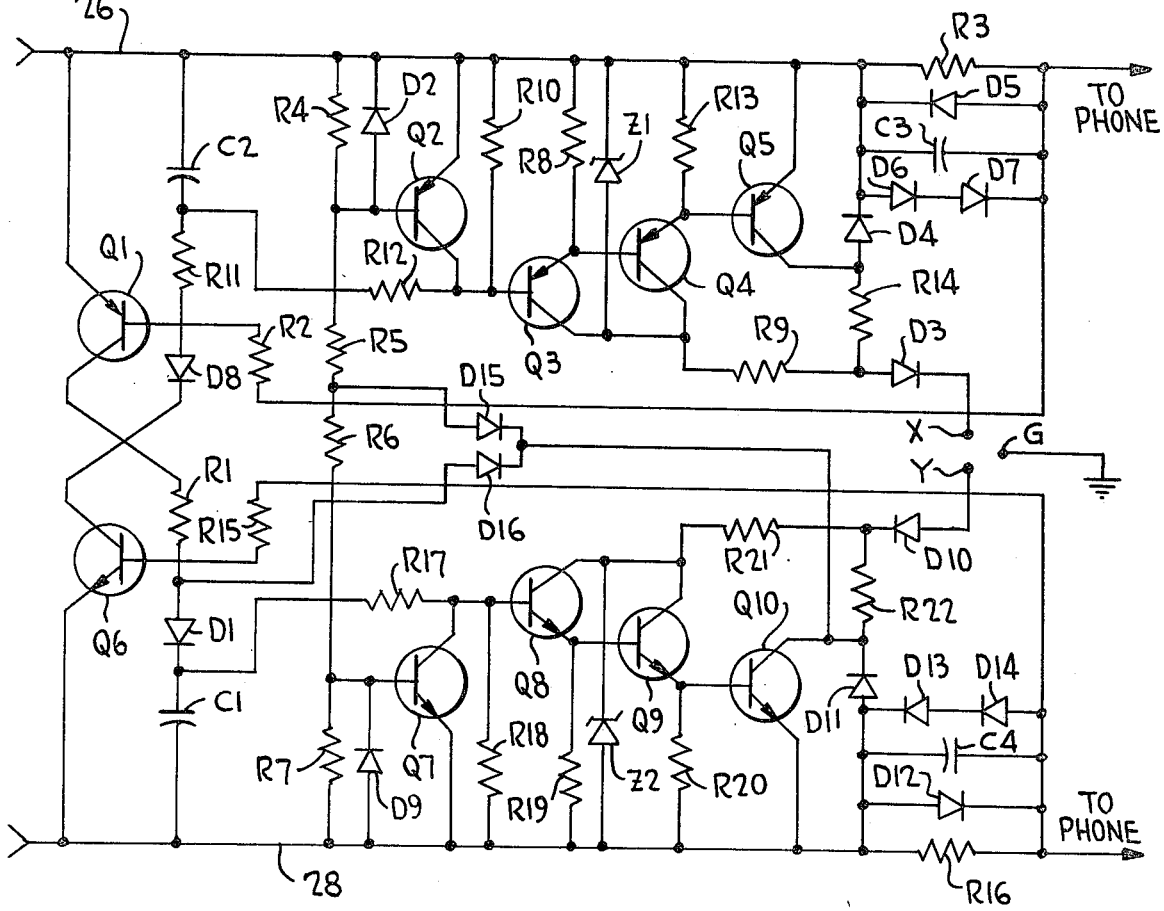
FIG. 2 is a schematic diagram of the identifier circuit of the present invention.

The identifier circuits 18 according to the present invention are identical with the exception of the connection of the X and Y terminals, and one of such identifier circuits is illustrated in FIG. 2 and includes a PNP charging transistor Q1 having an emitter connected with a bus 26 which is connected to a collector connected through a resistor R1, a diode D1, and a capacitor C1 in series, a bus 28, which is connected to ring lead R, and a base connected with bus 26 at a point directly connected with the telephone instruments 16 via a resistor R2, a resistor R3 being connected in series in bus 26. A PNP control transistor Q2 has an emitter connected to bus 26 and a base connected to bus 26 via a resistor R4 and a diode D2 connected in parallel, and the base is also connected with bus 28 via resistors R5, R6 and R7 in series. The collector of transistor Q2 is connected with the base of a PNP transistor Q3 having an emitter connected with bus 26 via a resistor R8 and with the base of a PNP transistor Q4 and a collector connected with the bus 26 via a Zener diode Z1 and to the collector of transistor Q4, the collectors of transistors Q3 and Q4 being connected with terminal X via a resistor R9 and a diode D3 in series. The base of transistor Q3 is connected to bus 26 via a resistor R10 and is connected with the junction between the series connection of a capacitor C2 and a resistor R11 via a resistor R12. A PNP test transistor Q5 has a base connected with the emitter of transistor Q4 and to the bus 26 via a resistor R13, an emitter connected with bus 26 and a collector connected to the junction between a resistor R14 and a diode D4 connected in series between bus 26 and the junction of resistor R9 and diode D3. A diode D5, a capacitor C3 and series diodes D6 and D7 are connected in parallel across resistor R3.

On the ring side of the identifier circuit 18, an NPN charging transistor Q6 has an emitter connected directly with bus 28, a collector connected with bus 26 via a diode D8 and resistor R11 and capacitor C2 in series and a base connected with the bus 28 at a point connected directly with the telephone instruments via a resistor R15, a resistor R16 being connected in series in the bus 28. An NPN control transistor Q7 has a base connected to the junction between resistors R6 and R7 with a diode D9 connected in parallel with resistor R7, a collector connected with the junction of diode D1 and capacitor C1 via a resistor R17 and an emitter connected directly to bus 28. An NPN transistor Q8 has a base connected with the collector of transistor Q7 and with bus 28 via a resistor R18 and an emitter connected with bus 28 via a resistor R19 and connected to the base of an NPN transistor Q9 which has an emitter connected with bus 28 via a resistor R20. The collector of transistor Q9 is connected with the collector of transistor Q8 and, through a resistor R21 and a diode D10, with a terminal Y, the collectors of transistors Q8 and Q9 also being connected with bus 28 via a Zener diode Z2. An NPN test transistor Q10 has a base connected with the emitter of transistor Q9, an emitter connected directly with bus 28 and a collector connected with the junction of a resistor R22 and a diode D11 connected in series between the bus 28 and the junction of resistor R21 and diode D10. A diode D12, a capacitor C4 and series diodes D13 and D14 are connected in parallel with resistor R16. The collector of resistor Q10 is also connected via a diode D15 with the junction between resistors R5 and R6 and, via a diode D16, with the junction between resistor R1 and diode D1.

In operation, with a four-party party line as shown in FIG. 1, party 2 would have both the X and Y terminals connected to the reference potential ground terminal G, party 3 would have the Y terminal connected to ground and party 4 would have the X terminal connected to ground. The identifier circuits 18 can be connected at any suitable point inside or outside of the premises such that each telephone instrument 16 of a party need not be individually wired.

The tip lead T is nominally 50 volts positive with respect to the ring lead R; and, accordingly, under quiescent conditions, control transistors Q2 and Q7 are conductive to clamp transistors Q3 and Q8 in nonconductive states, respectively, such that transistors Q4, Q5, Q9 and Q10 are also nonconductive. Charging transistors Q1 and Q6 are also nonconductive at this time since no current flows through resistors R3 or R16 due to the telephone instrument being on hook, and capacitors C1 and C2 are discharged via resistor R17 and transistor Q7 and resistor R12 and transistor Q2, respectively. Should a party other than the party with which identifier circuit 18 is associated go off hook, charging transistors Q1 and Q6 will remain nonconductive since no current will flow through resistors R3 or R16, and control transistors Q2 and Q7 will remain conductive due to a small voltage drop of about 5 volts across the telephone instrument 16.

When the party associated with the identifier circuit 18 goes off hook (lifts the handset), the voltage drops across resistors R3 and R16 are sufficient to render charging transistors Q1 and Q6 conductive to, respectively, charge capacitors C1 and C2. Charging transistor Q1 is protected from excessive forward or reverse base current by resistors R2 and R3 and diodes D5, D6 and D7; and, similarly, charging transistor Q2 is protected from excessive forward or reverse base current by resistors R15 and R16 and diodes D12, D13 and D14. Capacitors C3 and C4 bypass the base current resistor-diode protection networks to reduce audio insertion loss. Control transistors Q2 and Q7 will remain conductive when the associated party goes off hook due to the small voltage drop across the telephone.

The automatic number identifying equipment at the central office 14 typically removes loop voltage from the tip and ring leads for about seventy milliseconds prior to testing the line for ground marks; and, when the loop voltage is removed, control transistors Q2 and Q7 will be rendered nonconductive to permit capacitors C1 and C2 to discharge through the emitter-base circuits of discharging transistors Q8 and Q3, and resistors R17 and R12, respectively. While transistors Q3 and Q4 and transistors Q8 and Q9 are conductive due to the discharge of capacitors C2 and C1, respectively, the test transistors Q5 and Q10 will be conductive for a predetermined time to connect the X and/or Y terminals to ground G for positive and/or negative voltages on the tip and ring leads. Accordingly, when the automatic number identifying equipment applies a positive voltage to the line, current will flow through test transistor Q5 to ground G via resistor R14 and terminal X if terminal X is strapped to ground in the identifier circuit 18; and, similarly, when a negative voltage is applied to the line, current will flow through test transistor Q10 to ground G via resistor R22 and terminal Y if terminal Y is strapped to ground.

In this manner, it will be appreciated that party 1 will not exhibit a ground mark during application of either positive or negative voltage, party 2 will exhibit a ground mark for application of both positive and negative voltages, party 3 will exhibit a ground mark for application of negative voltage only and party 4 will exhibit a ground mark for application of positive voltage only. Thus, the output of the ground current detectors at the central office can be automatically monitored to identify a calling subscriber on the party line.

The automatic number identifying equipment will apply the positive test voltage to the ring lead R, or to both the tip and ring leads, for approximately seventy milliseconds, for example, to thereby identify the calling subscriber on a two-party line. Similarly, for a three or four party line, the negative test voltage is applied to the tip lead T, or to both the tip and ring leads, for approximately another seventy milliseconds. Since the telephone instruments 16 tie the tip and ring leads together, the lead to which the test voltage is supplied is insignificant.

In testing three or four party lines, the capacitor associated with the last polarity voltage test performed should be larger than the other capacitor to maintain the corresponding test transistor conductive longer. That is, for example, if the positive test voltage is applied last, capacitor C2 should be larger than capacitor C1 to maintain test transistor Q5 conductive longer than test transistor Q10. To this end, the capacitors C1 and C2 should be of a size to provide at least 300 millisecond pulse at very low temperatures, for example at −55° C.

A feedback connection from the collector of test transistor Q10 to the base of control transistor Q7 is established via diode D15 and resistor R6 such that, when transistor Q10 is conductive, diode D15 clamps control transistor Q7 off, and diode D16 is operative to clamp the junction of R1 and D1 such that capacitor C1 can receive no further charge. In this manner, test transistor Q10 and control transistor Q7 operate as a one-shot multivibrator to prevent control transistor Q7 from becoming conductive until capacitor C1 has discharged, the feedback connection being an optional feature permitting the identifier circuit 18 to be operative with two-party automatic number identifying equipment of the type which reapply normal line voltage during party identification testing and detect ground mark presence by virtue of unbalanced current since test transistor Q10 will remain conductive for the predetermined time even with line voltage reapplied.

Once the identification process is completed, loop voltage is restored to the party line 12 causing control transistors Q2 and Q7 to be immediately rendered conductive thereby rendering the testing transistors Q5 and Q10 nonconductive such that ground marks are exhibited only during identification testing except as described in the immediately preceding paragraph, in which case the loop voltage is restored.

From the above, it will be appreciated that the test transistors Q5 and Q10 are biased on for a predetermined time by the discharge of capacitors C1 and C2 such that ground marks established by selective connection of terminals X and Y with ground terminal G to represent calling party line subscribers remain for only the predetermined time and do not create a longitudinal imbalance.

The components of the identifier circuit 18 can have the following values, for example:

| | |
|---|---|
| Resistors R1 and R11 | 100 K |
| Resistors R4, R7, R10 and R18 | 3.3 M |
| Resistors R2 and R15 | 39 |
| Resistors R3 and R16 | 100 |
| Resistors R5, R12 and R17 | 300 K |
| Resistors R6 | 2.2 M |
| Resistors R8 and R19 | 100 K |
| Resistors R9 and R21 | 20 K |
| Resistors R13 and R20 | 10 K |
| Resistors R14 and R22 | 2 K |
| Diodes Z1 and Z2 | 130 volt Zener |
| Capacitor C1, C3 and C4 | 2.2 f |
| Capacitor C2 | 3.3 f |
| Transistor Q1 and Q2 | MPS 8599 |
| Transistor Q3 and Q4 | 2N-5401 |
| Transistor Q5 | MPS A92 |
| Transistor Q6 and Q7 | MPS-8099 |
| Transistor Q8 and Q9 | 2N-5551 |
| Transistor Q10 | MPS A42 |
| Diodes D1–D3, D5–D10 and D12–D16 | any silicon diode |
| Diodes D4 and D11 | 1N4934 |

Inasmuch as the present invention is subject to many variations, modifications and changes in detail, it is intended that all subject matter discussed above or shown in the accompanying drawings be interpreted as illustrative and not in a limiting sense.

What is claimed is:

1. An identifier circuit for connection between a telephone system party line and a party line subscriber comprising
bus means for connection with the party line;
a reference potential terminal; and
time control means connecting said reference potential terminal to said bus means for a predetermined time after voltage is removed from the party line in response to the party line subscriber going off hook whereby said party line identifier circuit can be tested to identify a calling party line subscriber during said predetermined time, wherein expiration of said predetermined time is marked by restoration of said party line voltage.

2. An identifier circuit as recited in claim 1 wherein said time control means includes normally nonconductive test switch means connected between said bus means and said reference potential terminal, said test switch means being conductive for said predetermined time.

3. An identifier circuit as recited in claim 2 wherein said time control means includes capacitor means charged from voltage on said bus means and a discharge path for said capacitor means, said capacitor means, said discharge path and the voltage on said bus means determining said predetermined time.

4. An identifier circuit as recited in claim 3 wherein said discharge path includes normally nonconductive discharge transistor means connected between said capacitor means and said bus means and said time control means includes normally conductive control transistor means connected between said discharge transistor means and said bus means for maintaining said discharge transistor means nonconductive and responsive to removal of voltage from the party line to permit said discharge transistor means to conduct to discharge said capacitor means.

5. An identifier circuit as recited in claim 4 wherein said test switch means includes test transistor means and said time control means includes a feedback path from said test transistor means to said control transistor means to maintain said control transistor means nonconductive for said predetermined time even if voltage is returned to the party line.

6. An identifier circuit for connection between a telephone system party line having first and second leads and a party line subscriber comprising
a first bus adapted to be connected with the first lead of the party line;
a second bus adapted to be connected with the second lead of the party line;

first and second terminals adapted to be connected with a reference potential in accordance with the identification of a particular party line subscriber;

first test switch means connected between said first terminal and said first bus and having a normally nonconductive state and a conductive state;

second test switch means connected between said second terminal and said second bus and having a normally nonconductive state and a conductive state;

control switch means connected with said first and second buses and said first and second test switch means and responsive to voltage on the party line to be in a first state to maintain said first and second test switch means in said nonconductive states or in a second state permitting said first and second test switch means to be placed in said conductive state; and biasing means connected with said first and second buses and operative to place said first and second test switch means in said conductive states for a predetermined time whereby testing of said party line to identify the party line subscriber can be accomplished during said predetermined time by applying test voltages to the party line to determine the connection of said first and second terminals with the reference potential.

7. An identifier circuit as recited in claim 6 wherein said biasing means includes capacitance means charged by voltage on the party line and discharged through said first and second test switch means.

8. An identifier circuit as recited in claim 7 wherein said capacitance includes first and second capacitors, and said biasing means includes a first charging transistor having a pair of electrodes connected in series with said first capacitor across said first and second buses and a second charging transistor having a pair of electrodes connected in series with said second capacitor across said first and second buses, said first and second transistors each having a control electrode for rendering said first and second charging transistors conductive in response to current flowing through the party line.

9. An identifier circuit as recited in claim 8 wherein said first test switch means includes a first test transistor having an emitter-collector circuit connected between said first terminal and said first bus and said second test switch means includes a second test transistor having an emitter-collector circuit connected between said second terminal and said second bus.

10. An identifier circuit as recited in claim 9 wherein said control means includes a first control transistor having an emitter-collector circuit connected between said first capacitor and said first bus and a base connected with said first bus through an impedance and a second control transistor having an emitter-collector circuit connected between said second capacitor and said second bus and a base connected with said second bus through an impedance.

11. An identifier circuit as recited in claim 10 wherein said first test switch means includes first transistor means connected with said first capacitor for discharge of said first capacitor therethrough, second transistor means connected with said second capacitor for discharge of said second capacitor therethrough, said first test transistor has a base connected with said first transistor means such that said first test transistor is conductive when said first capacitor discharges through said first transistor means, and said second test transistor has a base connected with said second transistor means such that said second test transistor is conductive when said second capacitor discharges through said second transistor means.

12. An identifier circuit as recited in claim 11 wherein said pair of electrodes of said first and second charging transistors are emitter and collector electrodes and said control electrodes of said first and second charging transistors are base electrodes and further comprising first impedance means connected in series in said first bus and second impedance means connected in series in said second bus, said emitter and base electrodes of said first charging transistor being connected across said first impedance means and said emitter and base electrodes of said second charging transistor being connected across said second impedance means.

13. An identifier circuit as recited in claim 2 wherein said first and second impedance means each includes oppositely poled diodes connected in parallel with a resistor to protect said first and second charging transistors against excessive base current.

14. An identifier circuit as recited in claim 13 wherein said first and second impedance means each includes a capacitor connected in parallel with said resistor to reduce audio insertion loss.

15. An identifier circuit as recited in claim 6 and further comprising feedback means between said first test switch means and said control switch means for maintaining said control switch means in said second state for said predetermined time even if the voltage on the party line changes.

* * * * *